US010802822B2

United States Patent
Ding et al.

(10) Patent No.: US 10,802,822 B2
(45) Date of Patent: Oct. 13, 2020

(54) SYSTEM AND METHOD FOR REPRODUCIBLE MACHINE LEARNING

(71) Applicant: ROYAL BANK OF CANADA, Montreal (CA)

(72) Inventors: Weiguang Ding, Toronto (CA); Yanshuai Cao, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 51 days.

(21) Appl. No.: 16/107,124

(22) Filed: Aug. 21, 2018

(65) Prior Publication Data

US 2019/0056931 A1 Feb. 21, 2019

Related U.S. Application Data

(60) Provisional application No. 62/548,200, filed on Aug. 21, 2017.

(51) Int. Cl.
| | |
|---|---|
| G06F 8/71 | (2018.01) |
| G06N 20/00 | (2019.01) |
| G06F 9/445 | (2018.01) |
| G06N 3/10 | (2006.01) |
| G06N 3/08 | (2006.01) |

(52) U.S. Cl.
CPC ............ G06F 8/71 (2013.01); G06F 9/44505 (2013.01); G06N 3/08 (2013.01); G06N 3/105 (2013.01); G06N 20/00 (2019.01)

(58) Field of Classification Search
CPC .... G06F 8/71; G06F 11/3664; G06F 11/3688; G06N 20/00; G06N 3/08
See application file for complete search history.

(56) References Cited

U.S. PATENT DOCUMENTS

| | | | | |
|---|---|---|---|---|
| 7,441,180 | B1 * | 10/2008 | Kaczmarek | G06F 21/10 715/201 |
| 2010/0250566 | A1 * | 9/2010 | Paul | G06F 16/283 707/756 |
| 2015/0169321 | A1 * | 6/2015 | Rissell | G06F 11/34 717/121 |
| 2016/0358103 | A1 * | 12/2016 | Bowers | G06F 9/4881 |
| 2017/0235568 | A1 * | 8/2017 | Cowan | G06F 8/73 717/122 |

(Continued)

OTHER PUBLICATIONS

Hefeeda et al "Distributed approximate spectral clustering for large-scale datasets." 21st international symposium on High-Performance Parallel and Distributed Computing. 2012. Retrieved on [Jun. 5, 2020] Retrieved from the Internet:URL<https://dl.acm.org/doi/pdf/10.1145/2287076.2287111> (Year: 2012).*

*Primary Examiner* — S. Sough
*Assistant Examiner* — Cheneca Smith
(74) *Attorney, Agent, or Firm* — Norton Rose Fulbright Canada LLP; Maya Medeiros

(57) ABSTRACT

Systems and methods for computationally generating a set of more "stable" configuration default values that are used for traceability and improving reproducibility of machine learning approaches. Hash values are generated based on a merged/modified configuration and both configuration content and hash are stored together in one or more data structures. These data structures can be used to link back to the actual values used in experiments.

20 Claims, 3 Drawing Sheets

(56) References Cited

U.S. PATENT DOCUMENTS

| 2017/0316081 A1* | 11/2017 | Kafai | G06F 16/285 |
| 2018/0018590 A1* | 1/2018 | Szeto | G06F 21/6254 |
| 2018/0089593 A1* | 3/2018 | Patel | G06N 5/003 |
| 2018/0225391 A1* | 8/2018 | Sali | G06N 20/00 |

* cited by examiner

SYSTEM AND METHOD FOR REPRODUCIBLE MACHINE LEARNING

FIELD

The present disclosure generally relates to the field of machine learning, and more particularly, to systems and methods for improving reproducibility of machine learning experiments.

INTRODUCTION

Reproducibility of experimentation is an important characteristic, providing the ability to conduct analyses based on the output data of experiment outcomes. However, in large scale machine learning experiments, there can be a multitude of variables and dependencies that are processed, and the machine learning devices may themselves be complex which makes it different to determine particular code and parameters at a given point in time when the experiment was conducted.

Large scale machine learning experiments can produce massive amounts of result files that correspond to different runs with different versions of the models, data, and configurations. Such result files could be used as inputs to another machine learning system, another analysis, or reporting, etc.

SUMMARY

In accordance with an aspect, there is provided a system for generating one or more data structures representative of one or more factors used in obtaining one or more outputs from machine learning program. The system has a machine learning pipeline input receiver configured to process one or more input files for the machine learning program and extract time-encoded data sets representative of: a data path or content, source code, hyperparameter configuration, and a software environment. The system has a hashing processor configured for generating a plurality of hash values corresponding to the data path or content, the source code, the hyper parameter configuration, and the software environment. The system has a data storage configured to store the plurality of hash values linked to one or more corresponding output files of execution of the machine learning program and to generate the one or more data structures representative of the one or more factors used in obtaining the corresponding one or more outputs.

In some embodiments, the system has a recovery mechanism configured to regenerate an original configuration of the machine learning mechanism based on the plurality of hash values and the one or more corresponding outputs of the machine learning mechanism.

In some embodiments, the hashing processor is configured to generate a hash value for the hyper parameter configuration by hashing content of a configuration file defining the hyper parameter configuration.

In some embodiments, the hashing processor is configured to generate a hash value for the source code using a version hash for a version control version number of the source code.

In some embodiments, the hashing processor is configured to generate a hash value for the data path or content using a checksum for the data path or content.

In some embodiments, the hashing processor is configured to generate a hash value for the software environment using an initialization script that generates the software environment.

In some embodiments, the hashing processor is configured to generate a hash value for the software environment using a version hash.

In some embodiments, the plurality of hash values are associated to a file name for the input files for the machine learning program and the corresponding output files.

In some embodiments, the plurality of hash values include a data path hash value, a source code hash value, a hyper parameter has value, and an environment hash value.

In some embodiments, the corresponding output files are stamped with a unique identifier generated using the data path hash value, the source code hash value, the hyper parameter has value, and the environment hash value.

In some embodiments, the system has an interface application for receiving the one or more input files for the machine learning program and displaying visual elements corresponding to the plurality of hash values.

In some embodiments, the plurality of hash values are used for a file name for the corresponding output files.

In some embodiments, the hyper parameter configuration merges default values for hyperparameters with values altered by input from a command line or interface application.

In some embodiments, the hashing processor is configured to compute changes in the source code that have been made prior to a repository commit to generate a code delta file, and compute a hash value corresponding to the code delta file.

In accordance with an aspect, there is provided a non-transitory computer readable medium storing instructions executable by a processor to configure the processor to: generate one or more data structures representative of one or more factors used in obtaining one or more outputs from machine learning program; process one or more input files for the machine learning program and extract time-encoded data sets representative of: a data path or content, source code, hyperparameter configuration, and a software environment; generate a plurality of hash values corresponding to the data path or content, the source code, the hyper parameter configuration, and the software environment; and store the plurality of hash values linked to one or more corresponding output files of execution of the machine learning program and to generate the one or more data structures representative of the one or more factors used in obtaining the corresponding one or more outputs.

In some embodiments, the computer readable medium further configures the processor to regenerate an original configuration of the machine learning mechanism based on the plurality of hash values and the one or more corresponding outputs of the machine learning mechanism.

In some embodiments, the computer readable medium further configures the processor to generate a hash value for the hyper parameter configuration by hashing content of a configuration file defining the hyper parameter configuration, generate a hash value for the source code using a version hash for a version control version number of the source code, generate a hash value for the data path or content using a checksum for the data path or content, generate a hash value for the software environment using an initialization script that generates the software environment.

In some embodiments, the plurality of hash values comprise a data path hash value, a source code hash value, a hyper parameter has value, and an environment hash value.

In some embodiments, the plurality of hash values are used for a file name for the corresponding output files.

In some embodiments, the computer readable medium further configures the processor to compute changes in the source code that have been made prior to a repository commit to generate a code delta file, and compute a hash value corresponding to the code delta file.

In accordance with an aspect, there is provided a system for generating one or more data structures representative of one or more factors used in obtaining one or more outputs from a machine learning mechanism, the system comprising: a machine learning pipeline input receiver configured to extract time-encoded data sets representative of: a data path or content, source code, hyperparameter configuration, and a software environment; a hashing mechanism configured for generating a plurality of hash values corresponding to the data path or content, the source code, the hyper parameter configuration, and the software environment; and a data storage configured to associate the plurality of hash values along with one or more corresponding outputs of the machine learning mechanism and to generate the one or more data structures representative of the one or more factors used in obtaining the corresponding one or more outputs.

In accordance with another aspect, the system further has a recovery mechanism configured to regenerate an original configuration of the machine learning mechanism based on the plurality of hash values and the one or more corresponding outputs of the machine learning mechanism.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
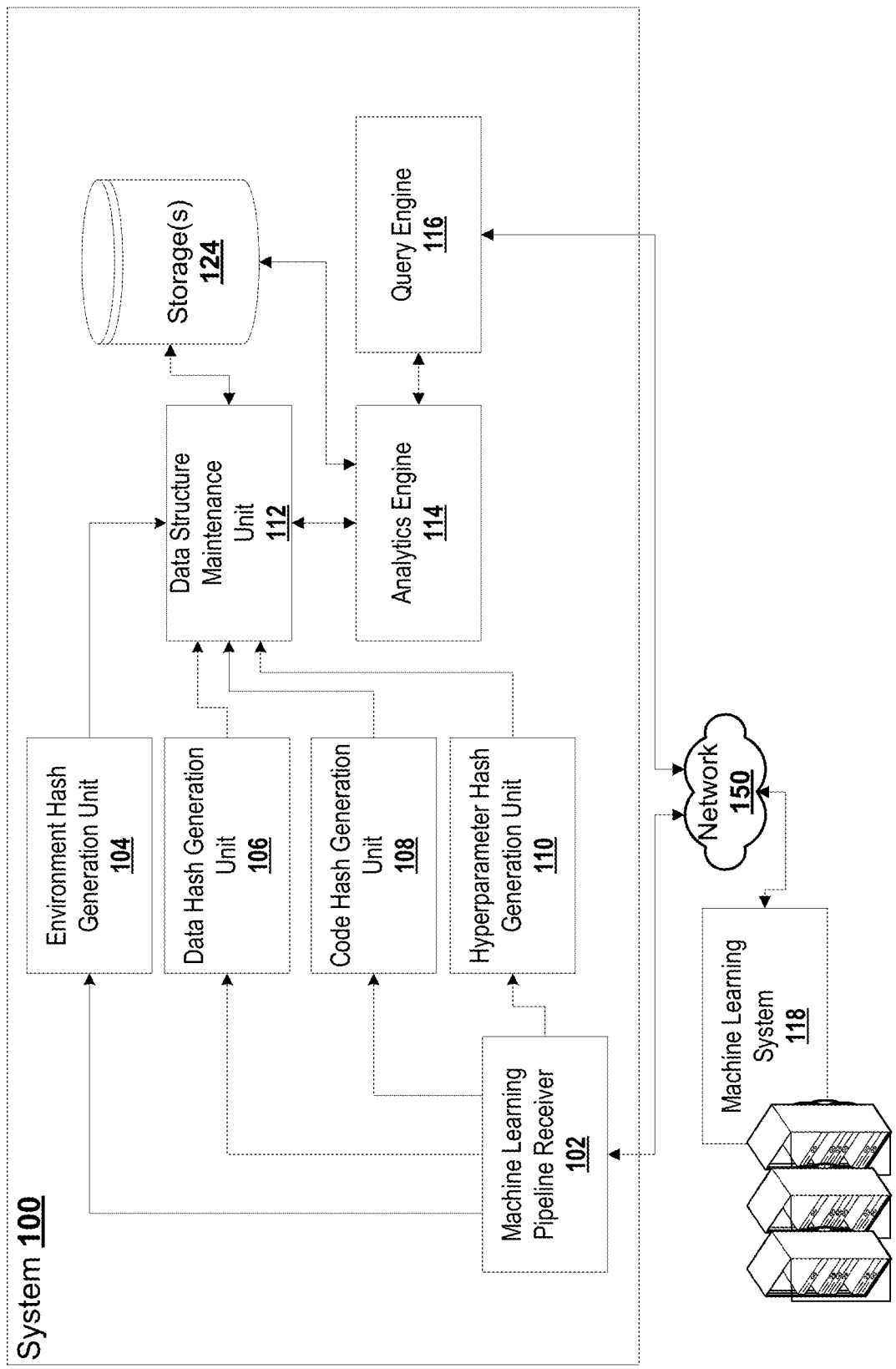
FIG. 1 is a block schematic of an example system for improving reproducibility of a machine learning outputs, according to some embodiments.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Large scale machine learning experiments can produce large amounts (e.g., hundreds of thousands) of result files, that correspond to different runs with different versions of the models, data, and configurations. In an effort to increase reproducibility and avoid bugs, embodiments described herein can provide the ability to trace back all variables that produced a specific result.

To ensure reproducibility, especially when results leave the boundary of the project, it is crucial to be able to trace back all factors that produced a specific result. Machine learning research and prototyping can require small but frequent modifications of hyperparameter settings or code features.

The problem of reproducibility is exacerbated in machine learning approaches. In practical machine learning implementations, before a project is in the final stage of releasing a report or product, significant effort is often spent on building model/algorithm features incrementally, tweaking them in various ways, and testing out the overall machine learning system every time. This aspect of developing a machine learning system differs from typical software engineering scenario and poses two potentially conflicting requirements: on one hand, researchers need to quickly alter behaviour of the machine learning system by modifying hyperparameter configuration, for example via command line arguments; on the other hand, all results potentially need to be traced back to its generating configuration and corresponding models need be recreated, all with as little overhead as possible for researchers.

Embodiments described herein can enable tracing of variables to determine or predict causality or relationships that produced the specific result. Brute-force approaches, for example, may require impractically large amounts of time and resources, and are unsuitable for the task.

Embodiments described herein can provide a system for ensuring traceability of hyperparameter configuration that supports fluid iterative changes. Prototyping machine learning systems for research and product requires frequent but small tweaking, which is unrealistic and undesirable to track in source code version. Committing such small changes before every experiment is inconvenient and often undesirable. On the other hand, losing track of what configuration generated which results could lead to erroneous conclusions and irreproducible results. The system is provided such that an approach is able to remove the human errors in tracking and retracing computational experiment results with a special focus on fast iterative machine learning research and prototyping.

Devices, systems, and methods are described in various embodiments that provide computer-implemented approaches to provide for improved reproducibility in machine learning. These devices, systems, and methods may be incorporated into a machine learning environment (e.g., a data center), or may be provided in a standalone computing unit that is in communication with a machine learning environment (e.g., a cloud-computing or distributed resources platform). The devices and systems include one or more processors that receive machine-interpretable instructions for execution. The devices and system can be configured to support the workflows specific to computational experiments in machine learning with little overhead, and ensures full tractability.

In operating machine learning systems, a set of more stable configuration default values that can be version-controlled with source files can be provided, and command line arguments can be used to modify default settings and parameters.

Embodiments described herein can provide a system to improve and to ensure traceability. The system can generate a hash corresponding to the actual merged/modified configuration. The system can store both configuration content and hash together in one or more data structures. The stored hash values can then be applied to captured output files, so that the data structures can be used to link back to the actual values used in experiments. The configuration content can change over time. The stored hash can enable improved reproducibility because the hash provides a snapshot of the configuration content at the time an experiment was conducted. Accordingly, when modifications of behaviors are be done, for example, on command line interfaces (e.g. interface application 330 of FIG. 3), the system is able to generate traceability information that allows for downstream linkages to results, and vice versa. For example, a configuration file can be stored, which can then be version controlled, and this configuration file may include linkages that provide "breadcrumbs" to the original settings, parameters, and/or underlying code such that a machine learning result can be easily reproduced. The hash can correspond to the original settings, parameters, and/or underlying code at the time the machine learning result was generated.

The system can be used for tracking a large volume of experiments and determining optimal configurations through ensuring reproducibility and tracking linkages that are then used to recreate models and to perform further iterations and optimizations.

FIG. 1 is a block schematic of an example system 100 for improving reproducibility of machine learning outputs, according to some embodiments.

System 100 can "snapshot" the state of an instance of machine learning using computed encoding or hash values. The "snapshot" can include input files and output files, such as the hyperparameters utilized and code version as an encoding (e.g., hashes). The hash values can be used in establishing filenames for output files, for example. Accordingly, system 100 can validate or verify that outputs and re-generate/re-trace the steps taken. Command line arguments, version code from version control system (e.g. git) of the input repository can be hashed by system 100 to produce a base hash code, and any uncommitted changes can be concatenated as a string and hashed into a second code, referred to as delta hash code. The combined hash code (e.g. delta-0x2b260543_base-0x3503073e) can be used as part of output filenames (e.g. nn-weights_delta-0x2b260543_base-0x3503073e_epoch-30.bin).

An issue for machine learning research is that the papers or results have been not reproducible. This can be because of falsified outputs or a failure to keep track of minor perturbations in hyperparameter selection or code commits onto a repository.

System 100 also can provide the ability to also track differences in code that have been made prior to the last repository commit (e.g., snapshotting the delta in code as well), as developers can forget to commit code before running an experiment. System 100 is configured to compute changes in the source code that have been made prior to a repository commit to generate a code delta file. System 100 is configured to compute a hash value corresponding to the code delta file. System 100 can be configured to determine the code delta file automatically and generate the hash before the result file is generated.

System 100 is configured to use the inputs, results to generate the unique identifier. System 100 is configured to use the identifier as the filename for the result files, or at least part of the filename, for example.

Accordingly, when a result is generated using machine learning system 118, system 100 is configured trace back all configurations to reproduce that result using the computed hashes. System 100 is configured to receive configuration data on command line or at an interface application 330 (FIG. 3), for example. System 100 is configured to generate one or more hash codes and store the hash codes on database at storage 124. The hash codes can be stored as a file name of the result files, for example. The result files can include weights of the neural net at a particular instance of training as a binary file, outputs of a neural net that draws images as a picture file, and so on. The storage 124 and data structure maintenance unit 112 can manage and store one or more databases of different software versions, configurations. The system 100 can access the different versions to compute the delta code file by a comparison of different versions or commits of the code.

Machine learning system 118 may forget to commit source code before running experiment. The actual version used for the result file may not be actual version reported. System 100 can automatically detect this and generate the delta code file. The system 100 can use the delta code file to generate the hash value. Any time code runs, the system 100 automatically stores these things in the database.

In some embodiments, the system 100 can split hash into multiple parts (e.g. 2 parts). A unique identifier can be generated by the base hash of configurations and the delta code file (difference from the uncommitted incremental source code hash). In order for system 100 to be reusable other data can be stored such as hyperparameter data and data pipeline configuration data. The system 100 can also store or track incremental changes in code using the delta code file. The system 100 can generate the delta code file by comparing results and changes in the code. Hash input data, and hash code will be different if data is changed so the system 100 can track this. The hash code of the input data is provided to the ML system 318 as a hyperparameter, which contributes to the hash code by the system. Therefore, if the input data file is modified, for e.g. if a new row of observation is added or some previous data point is altered, this change can result in different data hash, hence different overall system hash. The system 100 can use the result files to trace back to the configuration to produce the result. The different hash values computed by the system 100 can be used to identify the configurations. The hash values can be used as part of the filename for the results file.

When machine learning systems 118 are used, the user may forget to commit source code before running experiment. This can create versioning issues, where the run version is not the version recorded. System 100 can determine differences from uncommitted code and automatically scan for updates to the code.

System 100 can split the hash values or identifier into multiple parts. This can be based on the base hash of the configurations and the delta code file hash which hashes uncommitted source code changes (e.g. delta code file). System 100 can store the delta code file in storage 124 so that the corresponding changes are stored there and can be retrieved. The storage 124 stores the result files along with the computed hash values. The filename of the result files can include the computed hash values, for example. Machine learning system 118 can pass the data that was used as input to the system 100. The hash code of the result file can rely on the hash code of the input data. If someone changes the data, the hash code of the result can be different.

Machine learning systems 118 may include, for example, different machine learning platforms where computing systems are configured with an ability to learn or adapt without explicit programming. Machine learning systems 118 may be implemented by one or more computing systems including a combination of hardware and software. The machine learning systems 118 are configured to change and refine execution over a period of time (e.g., learning to learn by updating configurations to improve results), as machine learning systems 118 are exposed to different inputs and feedback parameters. For example, machine learning systems 118 may include computing platforms implementing neural networks, continuously refined optimization models, heuristic approaches, among others, and various biases are programmatically generated over a period of time. In various embodiments, machine learning systems 118 may be configured such that the underlying code of the computing systems 118 may also change over the period of time, etc.

These machine learning systems 118 may be used to generate various outcomes responsive to various inputs, such as predictions, confidence scores, identified relationships, output data values, among others. The machine learning systems 118 may also receive hyperparameters which impact execution and potentially outputs. As machine learning systems 118 may be modified after or even during execution, obtaining consistent reproducibility can be difficult. In machine learning, a hyperparameter can refer to a parameter whose value is set before the learning process begins. The values of other parameters can be derived via training or learning. The machine learning systems 118 can learn model parameters from data or fit model parameters to the data through a process that can be referred to as model training. Different models require different hyperparameters. Given hyperparameters, the training model can learn other model parameters from the data. The hyperparameters can represent properties of the model that are not learned from the training process, such as complexity or capacity to learn. They can be fixed or set before the training process starts. The hyperparameters can be varied (e.g. setting different values, training different models) to tune the machine learning systems 118. Some example hyperparameters include: number of leaves or depth of a tree, number of latent factors in a matrix factorization, learning rate, number of hidden layers in a neural network, number of clusters in a k-means clustering, and so on.

System 100 includes a machine learning pipeline receiver 102 for receiving various inputs from the machine learning systems 118. The inputs can include environment, data, code and hyper-parameter configuration, and so on. Input data for the environment can include docker container ID. Input data for the data can include MD5 hash code of the data file. Input data for the code can include git version plus uncommitted changes concatenated as string then hashed code. Input data for the hyperparameter config can be command line arguments that can be merged with default settings in source file as string, then hash code. These are example inputs.

When wall-clock time is not essential, there are four factors that can uniquely define the outcomes of a machine learning pipeline: software environment, data, code (which defines model and algorithms among other components), and hyperparameter setting configuration. Hyperparameter configuration can be absorbed into code but, typically, due to the need to frequently tune hyperparameters, hyperparameter configuration can be separated from code. Uniquely determining each of the four factors (environment, data, code and hyper-parameter configuration) can then uniquely define output. In some scenarios, randomness in randomized algorithms is not an issue because random seed can be defined in the code or hyper-parameter configuration which then makes the system deterministic.

These four factors may be extracted from data sets provided by the machine learning pipeline receiver 102, which may be connected through a network 150 (e.g., a local area network, the Internet, an Intranet, point to point networks). The system 100, for example, by way of environment hash generation unit 104, data hash generation unit 106, code hash generation unit 108, and hyper parameter hash generation unit 110, is configured to associate (e.g., assign, stamp) result files with unique hashes from each of the four components, ensuring all results are traceable, and hence reproducible. For example, the result file name can incorporate the hash.

For hyper-parameter configuration, the system 100 is configured to hash the content of the configuration file (using, for example, MD5, or a shorter code such as Adler-32). For code, the system 100 is configured to obtain the version hash from, for example, a version control development platform/repository (e.g., git). For input data, the system 100 is configured to hash the input data file using the MD5 checksum (or another shorter checksum or code), or the data path if the file is too large but is static and never modified. For the environment, the system 100 is configured to hash either the initialization script that builds the environment and uniquely defines it or any other unique version code.

These hashes are collected programmatically (and automatically) before the main machine learning experiment (by machine learning system 118) is initiated. The system 100 maintains the hashes on a data structure by data structure maintenance unit 112, and stored on data storage 124. The machine learning system 118 can provide the output results of the experiment to the system 100 for storage 124.

Results can be queried and explored using a an analytics engine 114 (e.g., traversing a database system) if all settings and their hashes are saved into a data storage 124 or a custom command line tool that is built for conducting queries on results (e.g., using query engine 116.

In various embodiments, the system can be implemented as a device that supports or provisions a command line or graphical user interface (GUI) tool (e.g. interface application 330) that receives, as inputs, the various components/factors used to generate the output result file. The hash values are associated (e.g., written, assigned) to each input and output file name after the tool has been executed. A data structure can be maintained to house the hash values and their associations, and this data structure can be traversed for tracing of downstream reproducibility of machine learning outputs.

Figure 2:
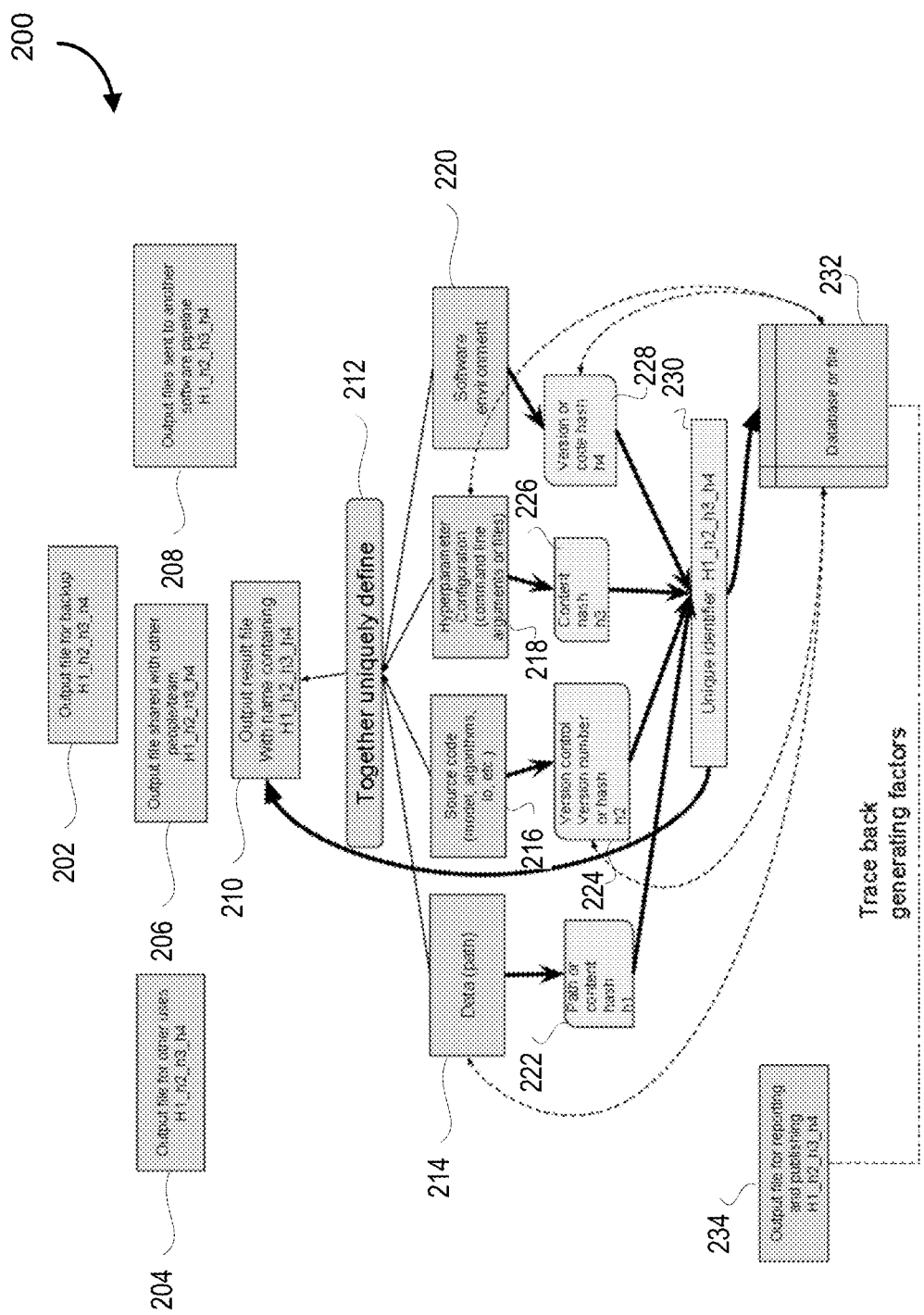
FIG. 2 is a flow diagram illustrative of an example workflow for generating a data structure containing hash values that uniquely define operating parameters at a time of execution of a machine learning mechanism, according to some embodiments.

FIG. 2 is a flow diagram illustrating example data output files 202-210, which together 212 uniquely define execution characteristics at a particular time of execution. Result files are stamped with unique identifiers that can be linked to each of the four components. The components are extracted and processed by system 100 to generate hashes from data 214-220, generating a set of hashes h1-h4 (222-228). For source code, the system 100 can receive the version hash from version control like git. For input data, the system 100 hashes the input data file using a checksum hash (e.g., MD5, shorter code), or the data path if the file is too large but is static and never modified. For the environment, the system 100 can generate hashes either from the initialization script that builds the environment and uniquely defines it or any other unique version code. For hyper-parameter configuration, the system 100 can hash the content of the configuration which is merged from default values and "one-off" modifications via command line arguments.

The codes h1, h2, h3, and h4 refer to individual hashes, one for each of the components/factors that defined the output. The code h1_h2_h3_h4 refers to a combination of the four hashes, which together form a unique identifier 230.

The output file 234 may contain the complete hash h1_h2_h3_h4 as part of its filename, and the other components may have their respective individual hash codes recorded as part of their respective filenames, and may be stored in a database 232 or a suitable data structure. By observing or interpreting the filename for the output file, a querying system or analytics system can quickly identify the input files that went into creating that file, by matching the hashes. These hashes 214-220 are collected programmatically before the main machine learning experiment is initiated so there is no human error possible.

Because hash functions are not invertible by definition, to ensure that given hash codes 214-220 one can recover the original inputs, the system 100 is configured to store the original information along with the hash, either in flat file (as part of filename for example) or in a database, in accordance with some embodiments. Afterwards, results can be queried and explored using either a database system, a document search engine such as ElasticSearch, or a custom command line query tool.

Machine learning experiments can require frequent small changes in some hyperparameter settings, at the same time, many other hyperparameters could be relatively more "stable" in the sense that they require less frequent experimentation. In this case, the system is configured to populate default values for hyperparameters in configuration files, which are tracked using version control. This can allow users to alter any default values using key-value pairs from the command line or interface application.

The actual configuration is merged from the two, and can be hashed into code h3 226, as shown in FIG. 2. Content of the merged configuration can be stored in a file or database 232 along with the hash, so that at any later stage, given any result file, one can use the hash code (stored as part of result file name or content) to recover (e.g., regenerate) the original configuration.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices.

In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

Figure 3:
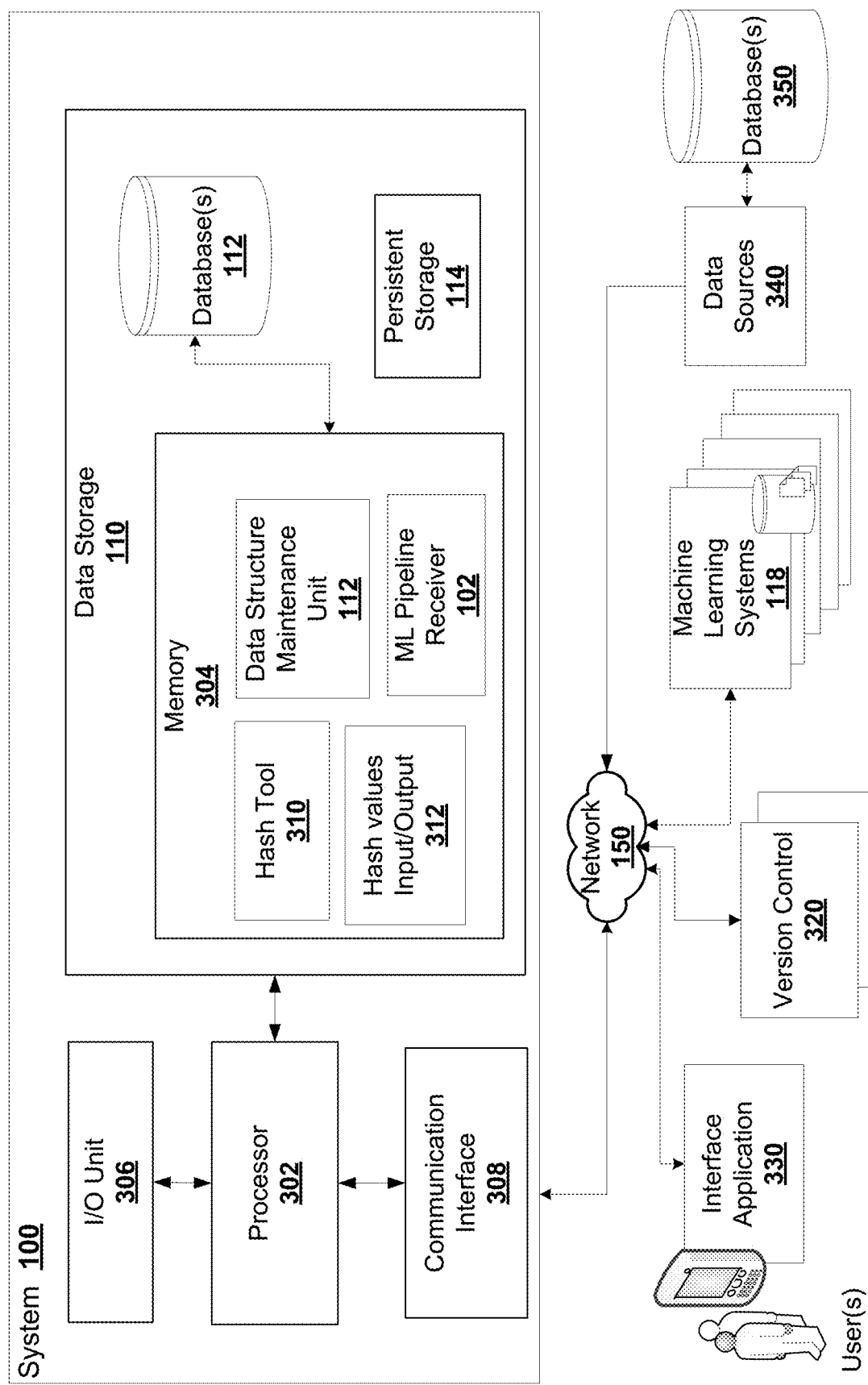
FIG. 3 is a block schematic of an example computing system, according to some embodiments.

FIG. 3 is a schematic diagram of system 100, exemplary of an embodiment. As depicted, computing device includes at least one processor 302, memory 304, at least one I/O interface 306, and at least one communication interface 308. The system 100 may be software (e.g., code segments compiled into machine code), hardware, embedded firmware, or a combination of software and hardware, according to various embodiments.

The processor 302 can execute instructions in memory 304 to implement aspects of processes described herein. The processor 302 can execute instructions in memory 304 to configure hash tool 310, hash values and corresponding input files and output files 312, data structure maintenance unit 112, machine learning pipeline receiver 102, and other functions described herein. The system 100 may be software (e.g., code segments compiled into machine code), hardware, embedded firmware, or a combination of software and hardware, according to various embodiments. The hash tool 310 can include environment hash generation unit 104, data hash generation unit 106, code hash generation unit 108, and hyper parameter hash generation unit 110. The hash tool is configured to associate (e.g., assign, stamp) result files (e.g. input/output files) with unique hash from each of the computed hash values 312 (e.g. by the components), ensuring all results are traceable, and hence reproducible.

The system 100 (and data structure maintenance unit 112) is configured for generating one or more data structures representative of one or more factors used in obtaining one or more outputs from machine learning program. The system 100 has a machine learning pipeline input receiver 102 configured to process one or more input files for the machine learning program and extract time-encoded data sets representative of: a data path or content, source code, hyperparameter configuration, and a software environment. The system 100 uses the hash tool 310 for generating hash values corresponding to the data path or content, the source code, the hyper parameter configuration, and the software environment. The system 100 has a data storage 110 configured to store the hash values linked to one or more corresponding output files of execution of the machine learning system 118. The system 100 can generate the one or more data structures representative of the one or more factors used in obtaining the corresponding one or more outputs.

In some embodiments, the system 100 has a recovery mechanism configured to regenerate an original configuration of the machine learning mechanism based on the plurality of hash values and the one or more corresponding outputs of the machine learning mechanism. Examples of the recovery mechanism are as follows.

At the time of hashing, input configuration can stored in a database along with the hash code, the recovery mechanism can perform a lookup like the following:
result_explorer.py-include cell_type:gru num_layers:2-exclude num_epochs:100

Which shows all experiments with hyperparameters cell_type set to gru and num_layers 2, and that is not trained for 100 epochs:
delta-0x2b260543_base-0x3d180756 exp_name:baseline hidden_size:1024 num_epochs:50 use_torch:True
delta-0x41b50803_base-0x365406f4 exp_name:baseline_gru hidden_size:200 num_epochs:20 use_torch:False
delta-0x45e80832_base-0x365406f4 exp_name:baseline_gru hidden_size:200 num_epochs:20 use_torch:False
delta-0x4a250923_base-0x40b3080e exp_name: hidden_size:200 num_epochs:20 use_torch:True
delta-0x59490a4d_base-0x495d0832 exp_name:dropout hidden_size:200 num_epochs:20 use_torch:True In some embodiments, the hashing tool 310 is configured to generate a hash value for the hyper parameter configuration by hashing content of a configuration file defining the hyper parameter configuration. In some embodiments, the hashing tool 310 is configured to generate a hash value for the source code using a version hash for a version control version number of the source code. In some embodiments, hashing tool 310 is configured to generate a hash value for the data path or content using a checksum for the data path or content. In some embodiments, the hashing tool 310 is configured to generate a hash value for the software environment using an initialization script that generates the software environment. In some embodiments, the hashing tool 310 is configured to generate a hash value for the software environment using a version hash.

In some embodiments, the hash values are associated to a file name for the input files for the machine learning program and the corresponding output files. In some embodiments, the hash values include a data path hash value, a source code hash value, a hyper parameter has value, and an environment hash value. In some embodiments, the corresponding output files are stamped with a unique identifier generated using the data path hash value, the source code hash value, the hyper parameter has value, and the environment hash value.

In some embodiments, the system 100 connects with an interface application 330 for receiving the one or more input files for the machine learning program and displaying visual elements corresponding to the plurality of hash values.

In some embodiments, the plurality of hash values are used for a file name for the corresponding output files. In some embodiments, the hyper parameter configuration merges default values for hyperparameters with values altered by input from a command line or interface application.

In some embodiments, the hashing tool 310 is configured to compute changes in the source code that have been made prior to a repository commit to generate a code delta file, and compute a hash value corresponding to the code delta file. This may involve version control 320 which can manage and/or store different versions of the code.

Each processor 302 may be, for example, microprocessors or microcontrollers, a digital signal processing (DSP) processor, an integrated circuit, a field programmable gate array (FPGA), a reconfigurable processor, a programmable read-only memory (PROM), or combinations thereof. Processors 302 are be used to implement the various logical and computing units of the system, for example, and different units may have different processors, or may be implemented using the same set of processors or the same processor.

Memory 304 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM). Memory 304 may be used to store test cases, test parameters, hash values, data structures, etc.

Each I/O interface 306 enables computing device 300 to interconnect with one or more input devices, such as a keyboard, mouse, camera, touch screen and a microphone, or with one or more output devices such as a display screen and a speaker. I/O interfaces 306 can include command line interfaces. These I/O interfaces 306 can be utilized to interact with the system, for example, to provide inputs, conduct inquiries, etc.

Each communication interface 308 enables computing device 300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others, including combinations of these. Network interfaces 308 are utilized, for example, to interact with various applications, receive inputs from remote machine learning systems, etc.

The system 100 can be operable to register and authenticate users (using a login, unique identifier, and password for example) prior to providing access to applications, a local network, network resources, other networks and network security devices. The system 100 can connect to different machines, entities 140, and/or data sources 150 (linked to databases 160).

The data storage 110 may be configured to store information associated with or created by the system 100, such as for example configuration data, hash values, result files, and so on. The data storage 610 may be a distributed storage system, for example. The data storage 110 can implement databases, for example. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for generating one or more data structures representative of one or more factors used in obtaining one or more output files from a machine learning program, the system comprising:
    a machine learning pipeline input receiver configured to process one or more input files for the machine learning program to generate the one or more output files and extract time-encoded data sets representative of: a data path or content, source code, hyper parameter configuration, and a software environment, the time-encoded data sets defining the one or more factors used in obtaining the one or more output files from the machine learning program;
    a hashing processor configured for generating a plurality of hash values comprising a hash value for the data path or content, a hash value for the source code, a hash value for the hyper parameter configuration, and a hash value for the software environment; and
    a data storage configured to store the one or more output files with a unique identifier as a combination of the plurality of hash values and the extracted time-encoded data sets representative of: the data path or content, the source code, the hyper parameter configuration, and the software environment with the hash value for the data path or content, the hash value for the source code, the hash value for the hyper parameter configuration, and the hash value for the software environment, wherein the unique identifier can be processed to generate the one or more data structures representative of the one or more factors used in obtaining the one or more output files.

2. The system of claim 1, further comprises a recovery mechanism configured to regenerate an original configuration of the machine learning program based on the plurality of hash values and the one or more output files of the machine learning program.

3. The system of claim 1, wherein the hashing processor is configured to generate the hash value for the hyper parameter configuration by hashing content of a configuration file defining the hyper parameter configuration.

4. The system of claim 1, wherein the hashing processor is configured to generate the hash value for the source code using a version hash for a version control version number of the source code.

5. The system of claim 1, wherein the hashing processor is configured to generate the hash value for the data path or content using a checksum for the data path or content.

6. The system of claim 1, wherein the hashing processor is configured to generate the hash value for the software environment using an initialization script that generates the software environment.

7. The system of claim 1, wherein the hashing processor is configured to generate the hash value for the software environment using a version hash.

8. The system of claim 1, wherein the plurality of hash values are associated to a file name for the input files for the machine learning program and the output files.

9. The system of claim 1, wherein the plurality of hash values comprise a data path hash value, a source code hash value, a hyper parameter hash value, and an environment hash value.

10. The system of claim 9, wherein the output files are stamped with a unique identifier generated using the data path hash value, the source code hash value, the hyper parameter hash value, and the environment hash value.

11. The system of claim 1 further comprising an interface application for receiving the one or more input files for the machine learning program and displaying visual elements corresponding to the plurality of hash values.

12. The system of claim 1, wherein the plurality of hash values are used for a file name for the output files.

13. The system of claim 1, wherein the hyper parameter configuration merges default values for hyper parameters with values altered by input from a command line or interface application.

14. The system of claim 1, wherein the hashing processor is configured to compute changes in the source code that have been made prior to a repository commit to generate a code delta file, and compute a hash value corresponding to the code delta file.

15. Non-transitory computer readable medium storing instructions executable by a processor to configure the processor to:
    generate one or more data structures representative of one or more factors used in obtaining one or more output files from a machine learning program;
    process one or more input files for the machine learning program to generate the one or more output files and extract time-encoded data sets representative of: a data path or content, source code, hyper parameter configuration, and a software environment, the time-encoded data sets defining the one or more factors used in obtaining the one or more output files from the machine learning program;
    generate a plurality of hash values comprising a hash value for the data path or content, a hash value for the source code, a hash value for the hyper parameter configuration, and a hash value for the software environment; and
    store the one or more output files with a unique identifier as a combination of the plurality of hash value and the extracted time-encoded data sets representative of: the data path or content, the source code, the hyper parameter configuration, and the software environment with the hash value for the data path or content, the hash value for the source code, the hash value for the hyper parameter configuration, and the hash value for the software environment, wherein the unique identifier can be processed to generate the one or more data structures representative of the one or more factors used in obtaining the one or more output files.

16. The computer readable medium of claim 15, further configuring the processor to regenerate an original configuration of the machine learning program based on the plurality of hash values and the one or more output files of the machine learning program.

17. The computer readable medium of claim 15, further configuring the processor to generate the hash value for the hyper parameter configuration by hashing content of a configuration file defining the hyper parameter configuration, generate the hash value for the source code using a version hash for a version control version number of the source code, generate the hash value for the data path or content using a checksum for the data path or content, generate the hash value for the software environment using an initialization script that generates the software environment.

18. The computer readable medium of claim 15, wherein the plurality of hash values comprise a data path hash value, a source code hash value, a hyper parameter hash value, and an environment hash value.

19. The computer readable medium of claim 15, wherein the plurality of hash values are used for a file name for the output files.

20. The computer readable medium of claim 15, further configuring the processor to compute changes in the source code that have been made prior to a repository commit to generate a code delta file, and compute a hash value corresponding to the code delta file.

* * * * *